(12) United States Patent
Hsu (10) Patent No.: US 8,297,843 B2
(45) Date of Patent: Oct. 30, 2012

(54) BALL RETAINER CHAIN, A METHOD OF MAKING THE SAME, AND A LINEAR GUIDE APPARATUS

(75) Inventor: Ming-Che Hsu, Tainan County (TW)

(73) Assignee: Chiefteck Precision Co., Ltd., Sinshih Township, Tainan County (TW)

( * ) Notice: Subject to any disclaimer, the term of this patent is extended or adjusted under 35 U.S.C. 154(b) by 350 days.

(21) Appl. No.: 12/724,847

(22) Filed: Mar. 16, 2010

(65) Prior Publication Data
US 2011/0158567 A1 Jun. 30, 2011

(30) Foreign Application Priority Data
Dec. 25, 2009 (TW) ................................ 98144979 A (51) Int. Cl.
*F16C 29/06* (2006.01)

(52) U.S. Cl. ..................... 384/45; 384/51; 29/898.067

(58) Field of Classification Search .............. 384/43–45, 384/51; 29/898.067
See application file for complete search history.

(56) References Cited

U.S. PATENT DOCUMENTS

| 5,988,883 | A * | 11/1999 | Takamatu et al. ............... 384/45 |
| 7,563,029 | B2 * | 7/2009 | Wu et al. ........................ 384/51 |
| 7,802,922 | B2 * | 9/2010 | Chen ............................... 384/51 |
| 2007/0147714 | A1 * | 6/2007 | Matsumoto et al. ............ 384/45 |
| 2007/0160313 | A1 * | 7/2007 | Kuo et al. ....................... 384/51 |
| 2008/0025653 | A1 * | 1/2008 | Matsumoto ..................... 384/43 |

* cited by examiner

*Primary Examiner* — Thomas R Hannon
(74) *Attorney, Agent, or Firm* — Muncy, Geissler, Olds & Lowe, PLLC (57) ABSTRACT

A ball retainer chain includes a flat belt with axially arranged holes defined thereon. A separating portion is disposed between every two holes; upper/lower spacers combine with the separating portion. The surface between the separating portion and the adjacent hole is formed by a smooth surface. Partial spacer is formed by a spherical surface that smoothly connected to the hole surface. The spherical surfaces interlacedly arranged at a right side a left side include an opening with a vertical direction and a lateral directions corresponding to the flat belt, so that a mold pair reliant on a slantwise opening and closing manner would complete an injection molding. A smooth cylindrical form at two ends of the flat belt connects to an indentation at an inner or a mold surface of the flat belt. Thereby, while applying the belt to a linear guide apparatus, the cylindrical form could adjustably bend inward or outward for achieving a fluent traveling.

7 Claims, 14 Drawing Sheets

BALL RETAINER CHAIN, A METHOD OF MAKING THE SAME, AND A LINEAR GUIDE APPARATUS

BACKGROUND OF THE INVENTION

1. Field of the Invention

The present invention relates to a ball retainer chain, a method of making the same, and a linear guide apparatus, in particular, the ball retainer chain retains a plurality of axially and serially balls arranged therein, and any two balls are separated at intervals, thereby permitting the ball retainer chain and the balls to run in a circulating motion within a recirculating passage of the linear guide apparatus.

2. Description of the Related Art

The conventional linear guide apparatus generally comprises a slider and a rail that is axially stretchable. The slider and the rail respectively provide at least one row of corresponding raceways. A series of balls is disposed between the raceways and is allowed contacting the raceways and roll thereon. The slider further provides a return passage and two turnaround channels disposed correspondent with each row of the raceways. The turnaround channels connect to the return passage and an end gate on the raceway for forming a recirculating passage. Whereby, the balls are able to enter the return passage from the raceway area through the turnaround channels, and then enter the raceway area again from the return passage through the turnaround channels. As a result, the balls are capable of cyclically traveling within the recirculating passage. Moreover, by means of the traveling of the balls, the slider would also unlimitedly move along the raceway on the rail.

In order to avoid any collision between any two balls, the slider further provides a ball retainer chain. Namely, a series of spacers are positioned between the balls and connected by a linking strip. Whereby, the spacers positioned between the balls would separate every two balls for preventing any collision. Thereby, the balls are positioned at intervals for the further circulation, and the slider would thence travel smoothly. A ball retainer chain issued by a Japanese unexamined patent publication No. 05-052217 directly inserts a ball into a resin mold for shaping an appropriate indentation to receive the ball. However, since the resin material readily contracts, the ball could not freely rotate within a hole provided by such ball retainer chain, and thence a resistance would be generated to adversely incur an uneven motion thereof.

Another ball retainer chain issued by a U.S. Pat. No. 5,988,883 employs a resin that changes its contracting rate after absorbing water or oil. Namely, an interstice between the balls and the spacers would be expanded after soaking for the balls to be freely rotated. However, the molding of such ball retainer chain has to insert balls into the mold, thereby incurring a more complicate molding means; the automation thereof is also intricate. In addition, since the spacers and the balls are densely combined with each other, the lack of the oil storage is emerged.

Another ball retainer chain issued by a US publication No. 2008-0025653 provides an upper-lower die to prevent an incomplete molding. Although some ragged edges would be still generated, the ball retainer chain would not be influenced and could still keep a smooth movement. However, such ball retainer chain could not allow the ball to be retained in the center of the hole by the spacer.

Another linear guide apparatus issued by an R.O.C. patent No. I294497 discloses at least two straightforward restricting surfaces respectively disposed at the front and the back of each separating portion. Wherein, an upper section and a lower section of each straightforward restricting surface individually form a flat-straight surface and a claw surface. Moreover, each two adjacent straightforward restricting surfaces are interlacedly disposed, and between each two adjacent separating portions an accommodation is formed for receiving the rolling element. Whereby, the periphery of each claw surface would restrict the balls to secure the rotation of the same therein. However, since the straightforward restricting surfaces on the separating portions are interlacedly disposed with each other, a sectional difference rather than an even surface is generated between the adjacent straightforward restricting surface and the claw surface. Additionally, each straightforward restricting surface is shaped by the mold from divergent directions, so ragged edges are readily generated at the place where the sectional difference occurs; therefore, the rolling element is subjected to be influenced and an unsmooth movement is incurred.

SUMMARY OF THE INVENTION

It is an object of the present invention to avoid the conventional shortcomings, like a laborious drawing of the dies, the unrestricted balls, and the annoying ragged edges, by providing a ball retainer chain and the method of making the same; additionally, an oil storage would be reserved between spacers and balls for increasing an oil-storage capability, so that a lubricant effect would be extended. Another object of the present invention is to overcome the uneven movement of the ball retainer chain in a guiding groove of a recirculating passage because of the obstruction of the sectional difference or the ragged edges.

The ball retainer chain in conformity with the present invention comprises a flat belt and a plurality of spacers. Wherein, the flat belt includes holes that are axially arranged and separating portions each disposed between every two of the holes. The spacers combine to the separating portions. A hole surface on the hole is formed between the flat belt along a vertical direction and two spacers. Each separating portion of the flat belt has an upper surface and a lower surface, and the upper surface and the lower surface respectively including a left side and a right side. The spacer is further divided into an upper spacer and a lower spacer that individually combine to the upper surface and the lower surface of the separating portion of the flat belt. Surfaces between the upper/lower spacers and the holes are formed by a smooth surface, a part of which is formed by a spherical surface and smoothly connected to the hole surface on the flat belt, allowing a connection between the holes and the spherical surfaces thereof to form an upper enveloping surface and a lower enveloping surface, respectively. The spherical surfaces include an opening; the other part of a smooth surface is arranged as an outward-stretched curve along a tangent line of the opening of the spherical surface. An opening direction of either the upper or the lower enveloping surface is slantingly disposed between a vertical direction of the cross-section of the flat belt and a horizontal direction of the cross-section of the flat belt of the flat belt. The spherical surfaces of the upper spacer and the lower spacer are interlacedly disposed at a left side and a right side, respectively. The opening directions are defined oppositely.

Abovementioned curve is formed by a cylinder.

Abovementioned curve is formed by a cone.

A ball retainer chain comprises a flat belt and a plurality of spacers. Wherein, the flat belt includes holes that are axially arranged and separating portions each disposed between every two of the holes. The spacers are combined to the separating portions. Serially and axially arranged balls are positioned in the holes, each two of which are separated by the spacer, so that the balls are able to stay in the holes. The ball retainer chain and the serial balls accommodated in the holes travel along a recirculating passage of a linear guide apparatus. The recirculating passage provides with a guiding groove for guiding two sides situated within the guiding groove. Therefore, the ball retainer chain would be ensured to travel justly at the appropriate position. Moreover, the ball retainer chain structures a cylinder at two ends of two sides on the flat belt. The flat belt includes either an inner side or an exterior side formed with at least one indentation behind the cylinder and smoothly connected thereto.

A linear guide apparatus for applying to the abovementioned ball retainer chain comprises:

a guiding member including a first raceway disposed on at least one side thereof; a slider disposed astride the guiding member including a second raceway disposed corresponding to the first raceway and two turnaround channels disposed at two ends of the second raceway, respectively; the turnaround channel having the other ends connected to a return passage, allowing a recirculating passage to be formed in the second raceway, the turnaround channel, and the return passage; the recirculating passage including at least one sealed guiding groove therein; the flat belt of the ball retainer chain including two sides, and at least one side thereof being situated in the guiding groove; a ball being set in each hole of the ball retainer chain for the ball retainer chain and the balls to be rolled within the recirculating passage, permitting the ball retainer chain and the balls to travel in the first raceway and the second raceway, so that the slider is able to move unlimitedly along the first raceway on the guiding member.

Herein, while the ball retainer chain and the serial balls retained in the holes travel in the linear guide apparatus, the recirculating passage provides a guiding groove, so that two sides of the flat belt of the ball retainer chain would be guided by within the guiding groove. Thereby, the movement of the ball retainer chain could be ensured for a suitable position. Moreover, since the recirculating passage is in fact a sealed passage, at least two portions like the guiding member and the slider are applied to form such passage. Convergent joints between the portions are generally defined on the junction of the straight return passage and the turnaround channel. Even if a chamfer is formed on the convergent joint of the guiding groove, sectional differences or ragged edges are still readily generated in view of any manufacturing errors. Wherein, the belt and the balls retained in the holes are guided by the guiding groove of the recirculating passage; namely, the belt and the balls enter the turnaround channel from the straight return passage, and vice versa. However, sectional differences at the exterior of the joints or ragged edges still exist thereon; therefore, a smooth surface that is formed closed to a cylinder is structured at the two ends of the belt. Additionally, an inner side of the belt has an indentation defined behind the cylindrical form and smoothly connected thereto. Hereby, since the indentation is not as thick as other portions on the flat belt, any force exerted thereto would readily bend the indentation. As a result, when the exterior of the cylindrical form at the front is impeded while traveling via the straight return passage through the turnaround channel, the cylindrical form would be bended inwardly. Accordingly, a preferable and smaller contacting angle between the cylindrical form and the obstruction could be achieved for enhancing the cylinder to pass the turning section smoothly. Preferably, the resistance from the obstruction against the belt could be also concurrently decreased. If the joints for structuring the recirculating passage are defined at the straight return passage or the turnaround channel, or if the ragged edges occupy a large area, the inner side of the guiding groove would possibly impede the two ends of the two sides on the flat belt. For solving this problem, the indentations defined behind the cylindrical form of the front end and smoothly connected thereto would be kept at the exterior of the belt. Thus, if the cylindrical form at the front encounters any obstruction at the inner side of the guiding groove, the cylindrical form would be bent outwardly for further passing therethrough. As it should be, if the joints on the passages encounter obstructions from both the inner and the exterior of the guiding groove, the indentations could be defined at both sides for the cylindrical form to be appropriately bent inwardly or outwardly, so that the entire mechanism would smoothly pass therethrough.

A method of making the ball retainer chain comprises a first mold part of each of left and right molds that are slantwise opened and closed along the opening direction of the spherical surface so as to combine with a second mold part of each of left and right molds for an injection molding. The two first mold parts of said left and right molds respectively form smooth surfaces and holes of the upper and lower spacers as well as an appearance of partial ball retainer chain. The two second mold parts of said left and right molds form a rest appearance of the ball retainer chain. The two first mold parts of said left and right molds include a parting line shaped at the hole. The parting line has an inclined angle that is not smaller than another inclined angle of a diagonal line on a cross-section of the hole on the flat belt. While the two first mold parts of said left and right molds are slantwise opened and closed, the inclined angle thereof is thence larger than the inclined angle of the parting line.

While the two first mold parts of said left and right molds are slantwise opened and closed, the inclined angle thereof is smaller than another inclined angle of the flat belt defined at a lateral side of the spherical surface, and the second mold part integrally combine with the first mold part.

The parting line of the two first mold parts of said left and right molds and the lateral side of the flat belt at the curve are defined on a same smooth surface.

Accordingly, the present invention has the following advantages:

1. The laborious drawing of the dies, the unrestricted balls, and the annoying ragged edges in time of extruding and forming the designate object would be conquered. Moreover, an oil storage would be reserved between the spacers and the balls for promoting the oil storage capability and extending the lubricant effect.
2. In time of extruding and forming the designated belt, the opening direction of the left mold and the right mold could be slantingly opened and closed along the spherical surface for obtaining a complete ball retainer chain.
3. The two ends at the two sides of the flat belt are formed as a cylindrical form. At least one indentation is defined behind the cylindrical form at either the inner side or the outer side of the flat belt, and the indentation is also smoothly connected to the cylindrical form. By means of the inward or outward bending of the cylindrical form, the movement of the correspondent mechanism could be unobstructed in the recirculating passage of the linear guide apparatus.

DETAILED DESCRIPTION OF THE PREFERRED EMBODIMENTS

Figure 1:
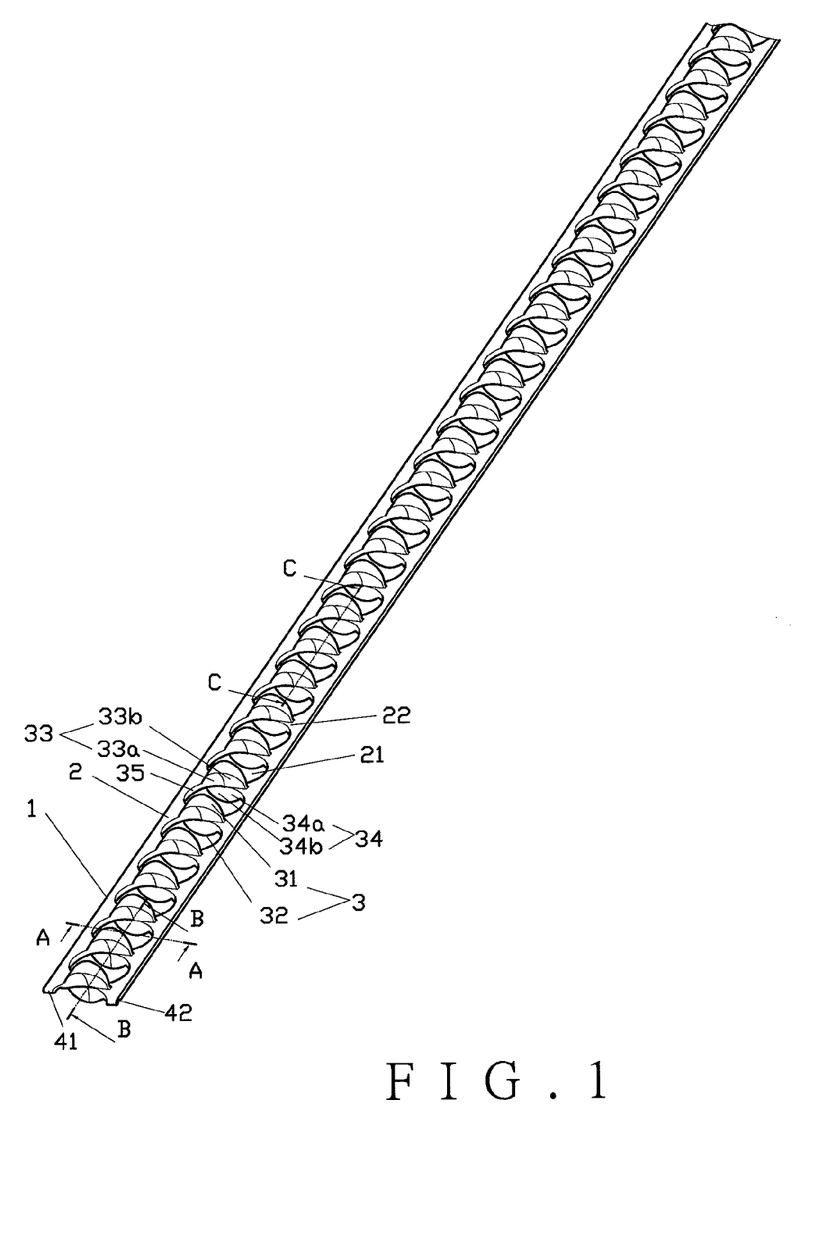
FIG. 1 is a top-right perspective view showing a ball retainer chain of the present invention.
Figure 2:
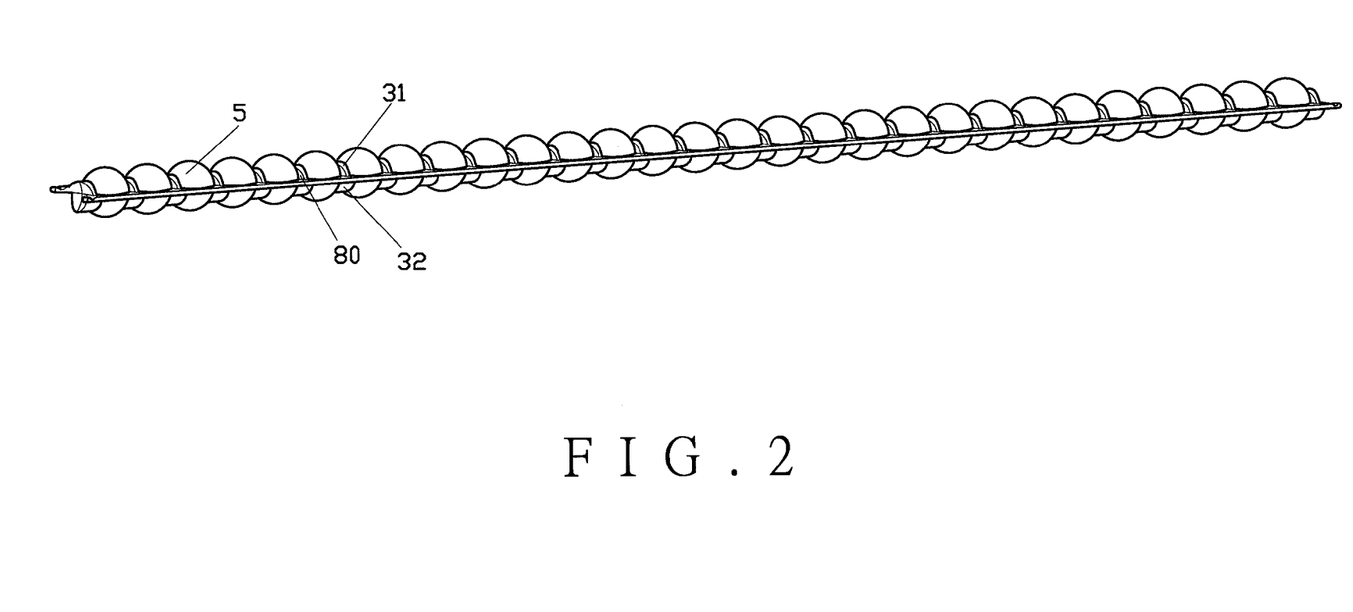
FIG. 2 is a side perspective view showing the ball retainer chain and a series of balls of the present invention.

FIG. 1 shows a ball retainer chain of the present invention. The ball retainer chain (1) comprises a flat belt (2) and a plurality of spacers (3). Wherein, the flat belt (2) includes holes (21) that are axially arranged and separating portions (22) each disposed between every two of the holes (21). The spacers (3) combine to the separating portions (22). The spacer (3) is divided into an upper spacer (31) and a lower spacer (32). A hole surface (35) on the hole (21) is formed between the flat belt (2) along a vertical direction and two spacers (3). As shown in FIG. 2, a series of balls (5) are retained in the holes (21) and each two of which are separated at intervals by the spacer (3). As shown in FIG. 1, the upper spacer (31) and the lower spacer (32) have their smooth surfaces (33), (34) set corresponding to the holes (21), and a part of the smooth surfaces (33), (34) are formed by spherical surfaces (33a), (34a) slightly larger than the balls (5) and smoothly connected to the hole surface (35) on the flat belt (2). Additionally, an upper enveloping surface (37) and a lower enveloping surface (38) of the balls (5) are formed by the smooth connection between the spacers (31), (32) and the spherical surfaces (33a), (34a) in FIGS. 4 and 5.

Figure 3:
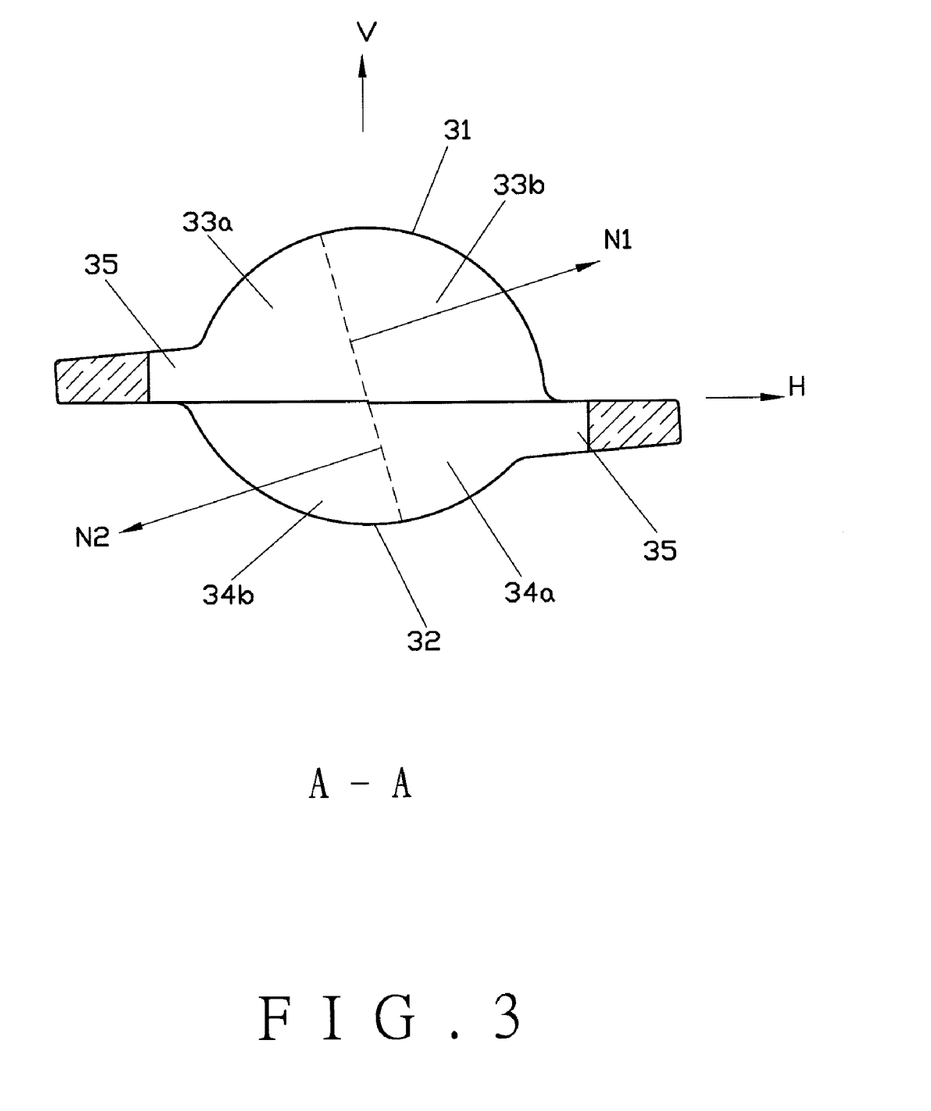
FIG. 3 is a cross-sectional view showing section A-A in FIG. 1.

The upper and the lower spherical surfaces (33a), (34a) are interlacedly disposed at a left side and a right side, respectively. Corresponding opening directions (N1), (N2) of the spherical surfaces (33a), (34a), i.e. the slantingly opening/ closing directions of left and right molds (60), (70), are defined oppositely as shown in FIG. 3. The spacers (31), (32) have their respective smooth surfaces (33), (34) disposed in correspondence with the balls (5). Wherein, the other parts of the smooth surfaces are respectively arranged as outward-stretched curves (33b), (34b), formed by a cylinder or conical contour, along a tangent line of the opening of the spherical surfaces (33a), (34a) as shown in FIG. 1. The opening directions (N1), (N2) of the upper and the lower spherical surfaces (33a), (34a) are disposed between a vertical direction (V) of the cross-section of the flat belt and a horizontal direction (H) of the cross-section of the flat belt of the flat belt (2). Wherein, the more slant the opening directions (N1), (N2) of the spherical surfaces (33a), (34a) are disposed with respect to the horizontal direction (H) of the flat belt (2), the larger area of the spherical surfaces (33a), (34a) is provided, and the stronger retaining force is introduced by the vertical direction (V) upon the balls (5) as shown in FIG. 3.

Figure 6:
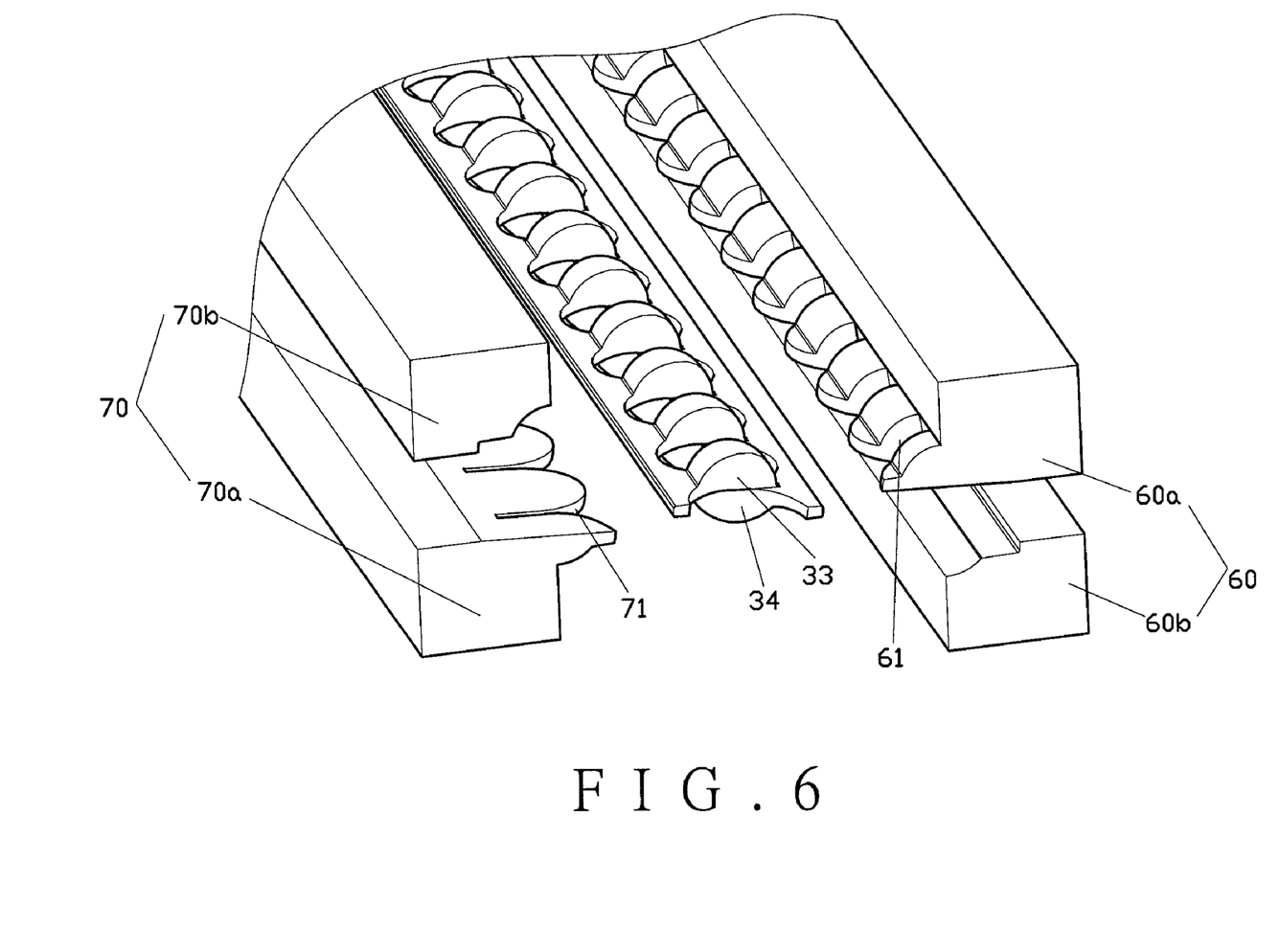
FIG. 6 is a perspective view showing a first mold part and a second moldpart, which includes a left die and a right die, respectively, of a correspondent smooth surface on the upper spacer and the lower spacer.

The spherical surfaces (33a), (34a) and the curves (33b), (34b) of either the cylinder or the cone shape construct smooth surfaces (33), (34). Mold surfaces (61), (71) of the first mold parts (60a), (70a) of the molds (60), (70) would be disposed in accordance with the smooth surfaces (33), (34). The first mold parts (60a), (70a) could be slantingly opened and closed along the spherical surfaces (33a), (34a) with the opening directions (N1), (N2), so that the opening and closing would not interfere with the smooth surfaces (33), (34). The disposition manner of the lower spacers (32) and the upper spacers (31) are opposite, so the smooth surfaces (33), (34) of the upper spacers (31) and the lower spacers (32) could be respectively extruded and formed by the first mold parts (60a), (70a) of the molds (60), (70) as shown in FIG. 6.

Figure 7:
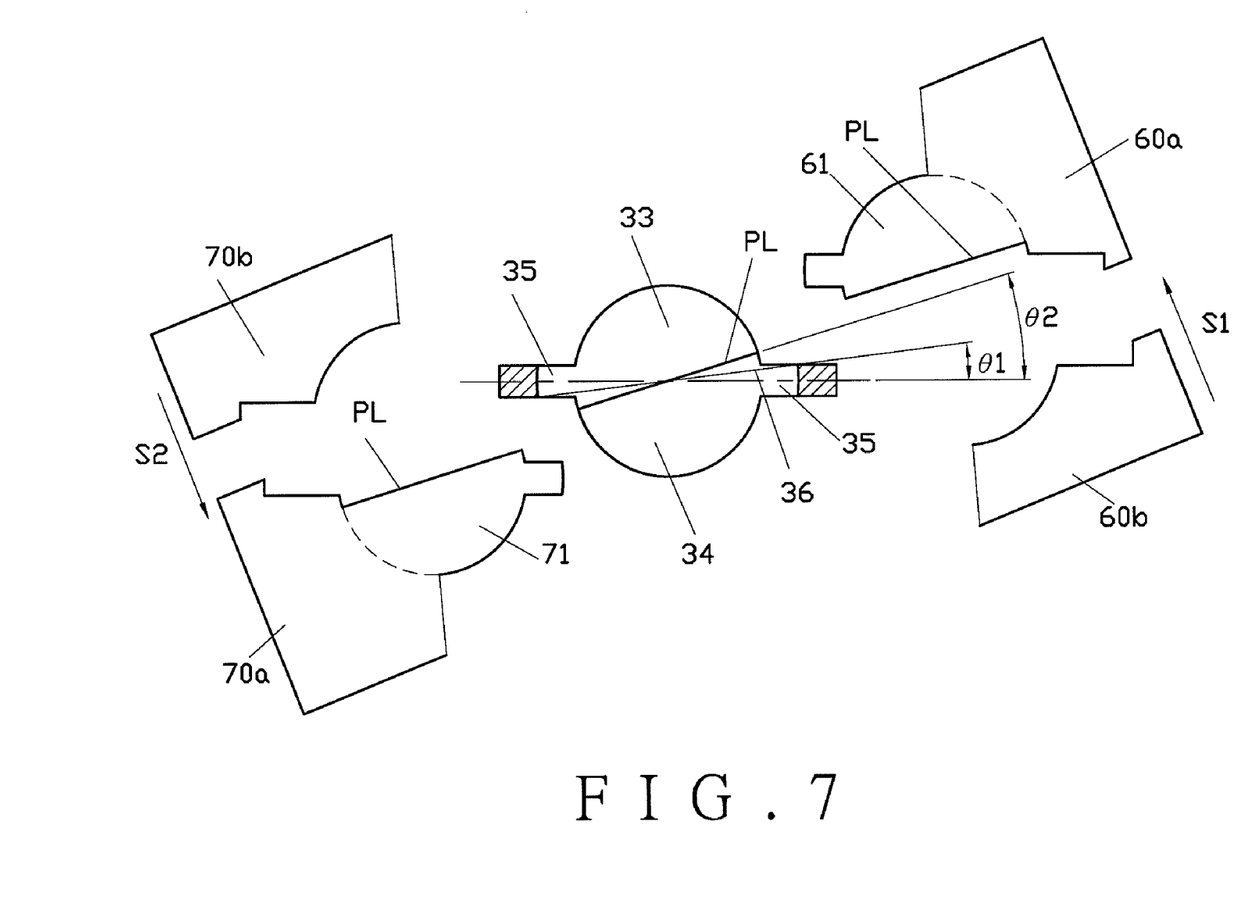
FIG. 7 is a schematic view showing the two first mold parts and the two second mold parts of the left mold and the right mold, as well as the correspondent smooth surfaces on the upper spacer and the lower spacer.

As shown in FIG. 7, the first mold parts (60a), (70a) include a parting line (PL) defined at the hole on a portion serving to shape the smooth surfaces (33), (34) that are disposed with respect to the upper and lower spacers (31), (32). The parting line (PL) has an inclined angle (θ2) that is not smaller than another inclined angle (θ1) of a diagonal line (36) on a cross-section of the hole (21) on the flat belt (2), namely (θ2)>=(θ1). As a result, the smooth surfaces (33), (34) disposed correspondingly to the spacers (31), (32) and the hole surfaces (35) on the flat belt (2) could be concurrently extruded and formed as well as levelly connected by the corresponding mold surfaces (61), (71) of the first mold parts (60a), (70a) of the molds (60), (70). The mold surfaces (61), (71) of the first mold parts (60a), (70a) of the molds (60), (70) form the smooth surfaces (33), (34) in the relationship with the spacers (31), (32), and form the hole surfaces (35) on the flat belt (2). Also, partial appearance of the accommodating belt is concurrently formed. As it should be, the second mold parts (60b), (70b) are applied to form the other appearance of the accommodating belt.

Figure 8:
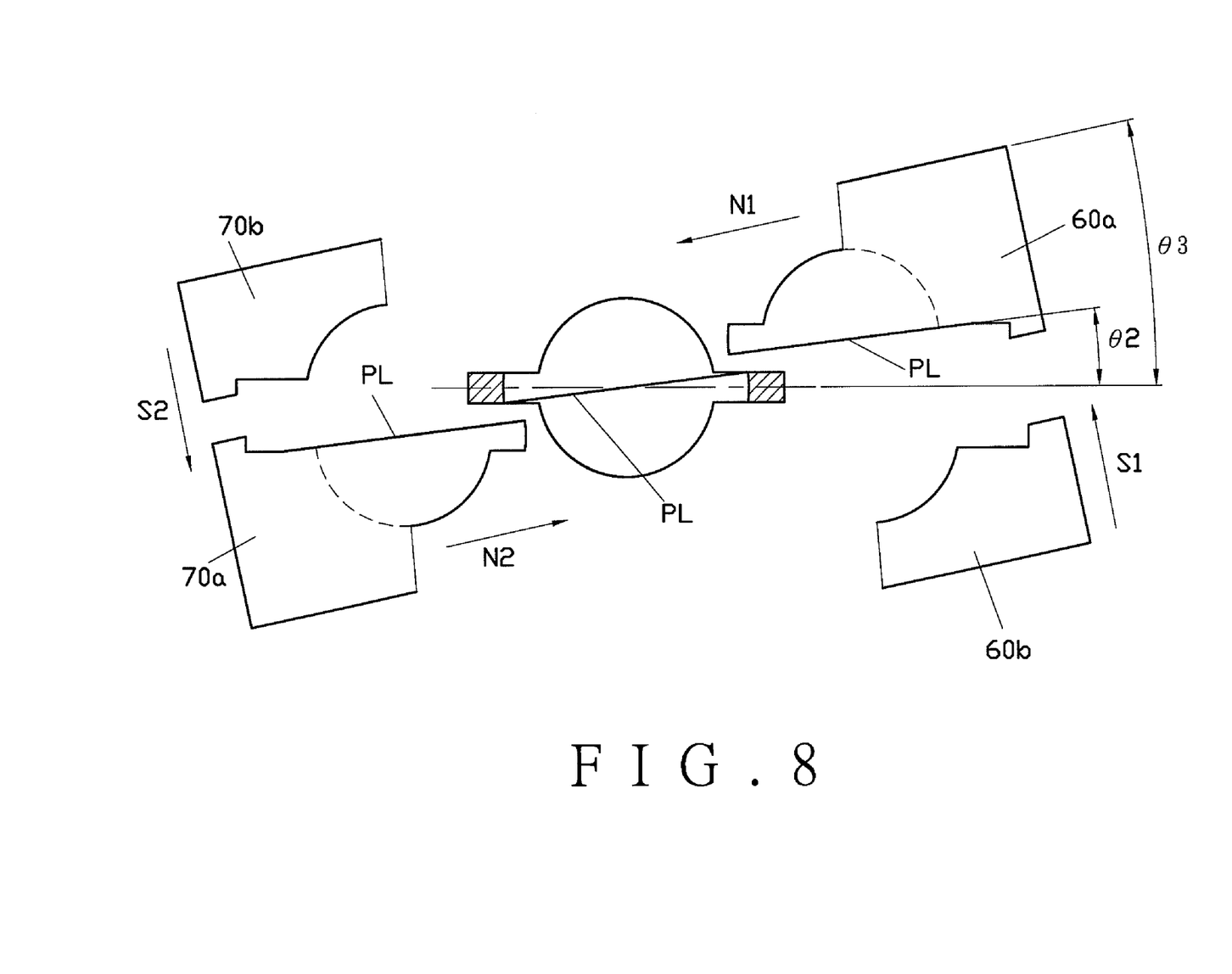
FIG. 8 is a schematic view showing a first preferred embodiment of the present invention; especially showing the correspondent smooth surface between the upper as well as the lower spacers and the balls on the two second mold parts, and so are the two first mold parts.

A first preferred embodiment of the present invention is shown in FIG. 8. While the first mold parts (60a), (70a) of the molds (60), (70) are slantwise opened and closed along the directions (N1), (N2) whose inclined angles (θ3) would be thence larger than the inclined angle (θ2) of the parting line (PL), that is, (θ3)>(θ2). Thus, the molds (60), (70) could be slantwise opened and closed, and they would not interfere with each other. Concurrently, the smooth surfaces (33), (34) with respect to the spacers (31), (32) and the hole surfaces (35) on the flat belt (2) could be formed; partial appearance of the accommodating belt could be also reserved. When the first mold parts (60a), (70a) move along the slant opening and closing directions (N1), (N2), the second mold parts (60b), (70b) would accordingly move along the moving directions (S1), (S2). Accordingly, the rest of the partial appearance of the accommodating belt could be extruded and formed.

Figure 9:
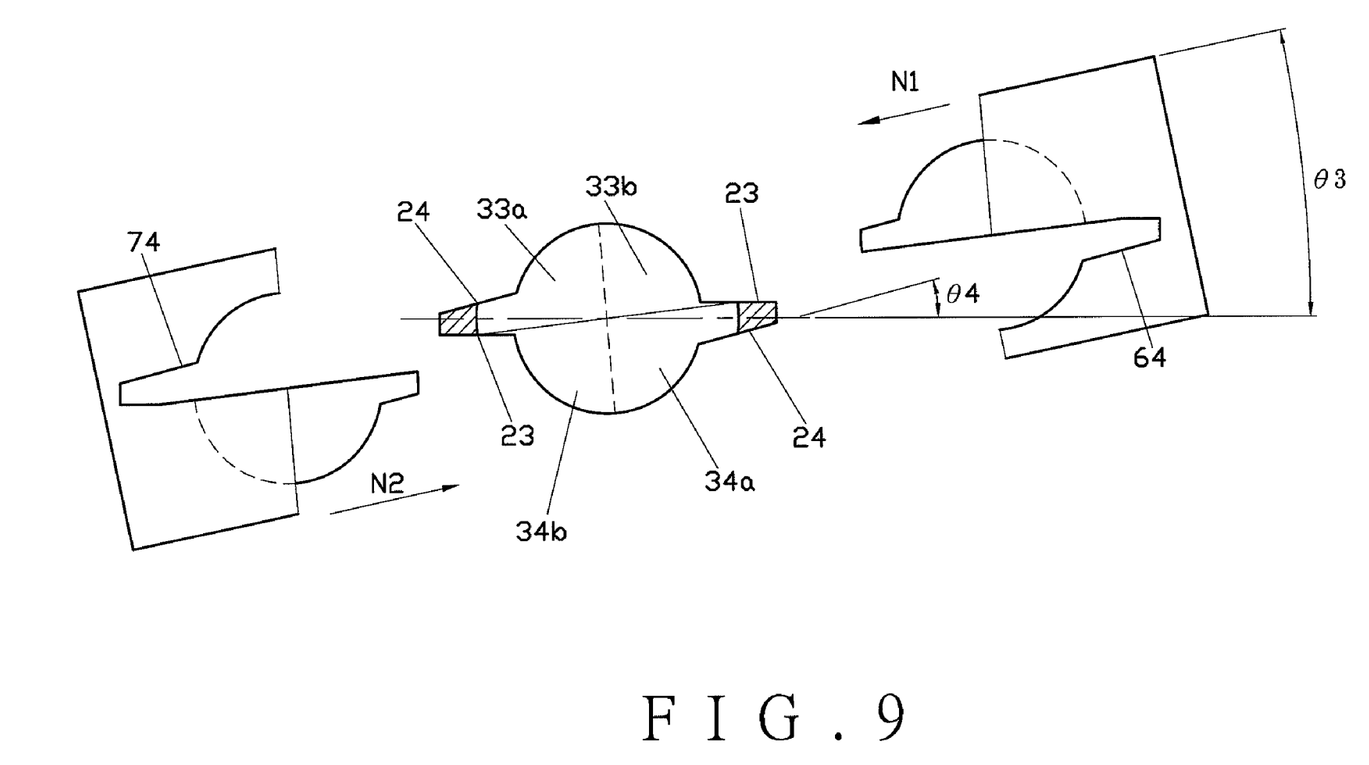
FIG. 9 is a schematic view showing a second preferred embodiment of the present invention; especially showing the correspondent smooth surface between the left and the right molds, the upper as well the lower spacers and the balls.

FIG. 9 shows a second preferred embodiment of the present invention. Wherein, the upper section and the lower section of the flat belt (2) with the holes (21) are respectively divided into a first flank (24) disposed at the same side as the spherical surfaces (33a), (34a), and a second flank (23) disposed at the same side as the cylinder or the cone curves (33b), (34b) in this embodiment. When the inclined angle (θ4) of the first flank (24) is larger than the inclined angle (θ3) of the opening and closing directions (N1), (N2) of the molds (60), (70), that is, (θ4)>(θ3), the second mold parts (60b), (70b) of the molds (60), (70) could be integrally combined with the first mold parts (60a), (70a). Preferably, the molds (60), (70) would not interfere with each other for smoothly exerting their slantwise opening and closing movement so as to concurrently inject and mould the flat belt (2), separating portions (22), the spacers (31), (32), and the holes (21). Therefore, the molds (60), (70) could accordingly structure a complete ball retainer chain (1).

Figure 10:
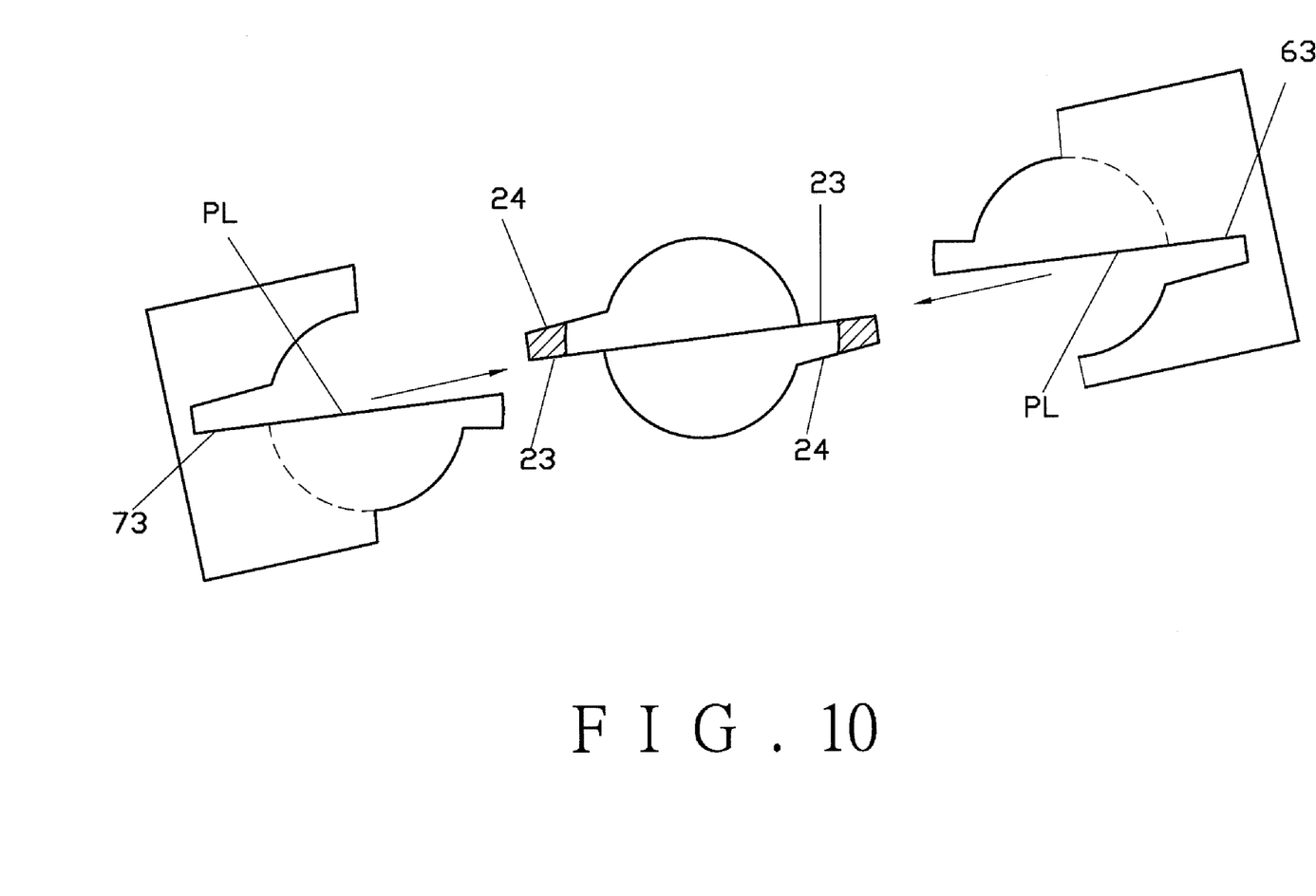
FIG. 10 is a schematic view showing a third preferred embodiment of the present invention; especially showing the correspondent smooth surface between the left and the right molds, the upper as well the lower spacers and the balls.

FIG. 10 shows a third preferred embodiment of the present invention. Wherein, when the second flank (23) at the side that comprises the cylinder or cone curves (33b), (34b) on the top and the bottom of the flat belt (2) is formed on the same plane as the parting line (PL) defined on the molds (60) (70) where the smooth surfaces (33a), (34a) in the relationship to the spacers (31), (32) are molded, the mold surfaces (63), (73) of the second flank (23) from the molds (60), (70) and the parting line (PL) are arranged on the same plane as well. Therefore, such mechanism is beneficial to be manufactured as well as precisely opened and closed; the designated object could be readily formed by injection molding.

Figure 4:
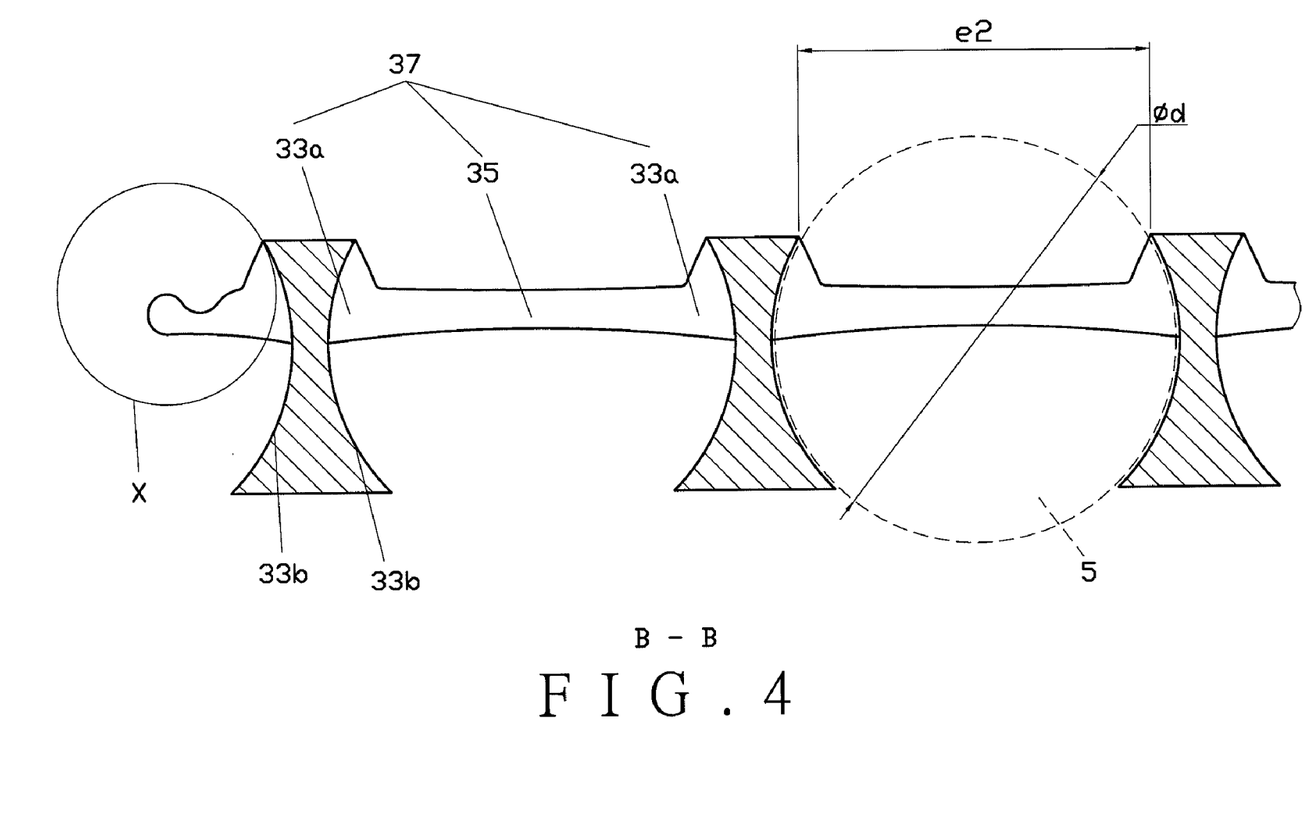
FIG. 4 is a cross-sectional view showing section B-B in FIG. 1.
Figure 5:
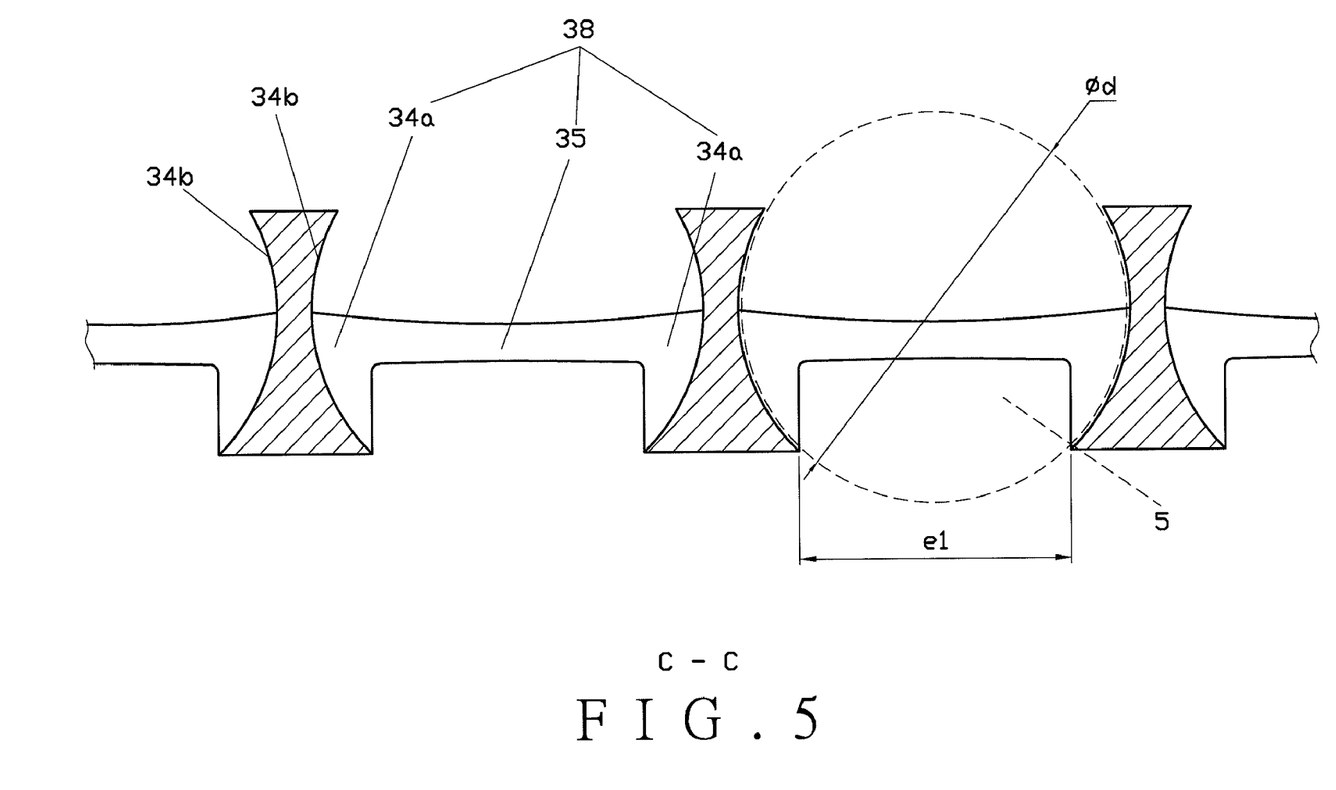
FIG. 5 is a cross-sectional view showing section C-C in FIG. 1.

Referring to FIGS. 4 and 5, the rolling balls (5) are firmly restricted within the holes (21) of the flat belt (2) from the hole surfaces (35) thereof, and the diameters (e1), (e2) of the smooth surfaces (33a), (34a) of the spacers (31), (32) are smaller than the ball caliber (φd).

Referring to FIGS. 1 and 2, an oil storage (80) is defined between the cylinder or cone curves (33b), (34b) of the spacers (31), (32) for being served to store the lubricant oil.

Figure 11:
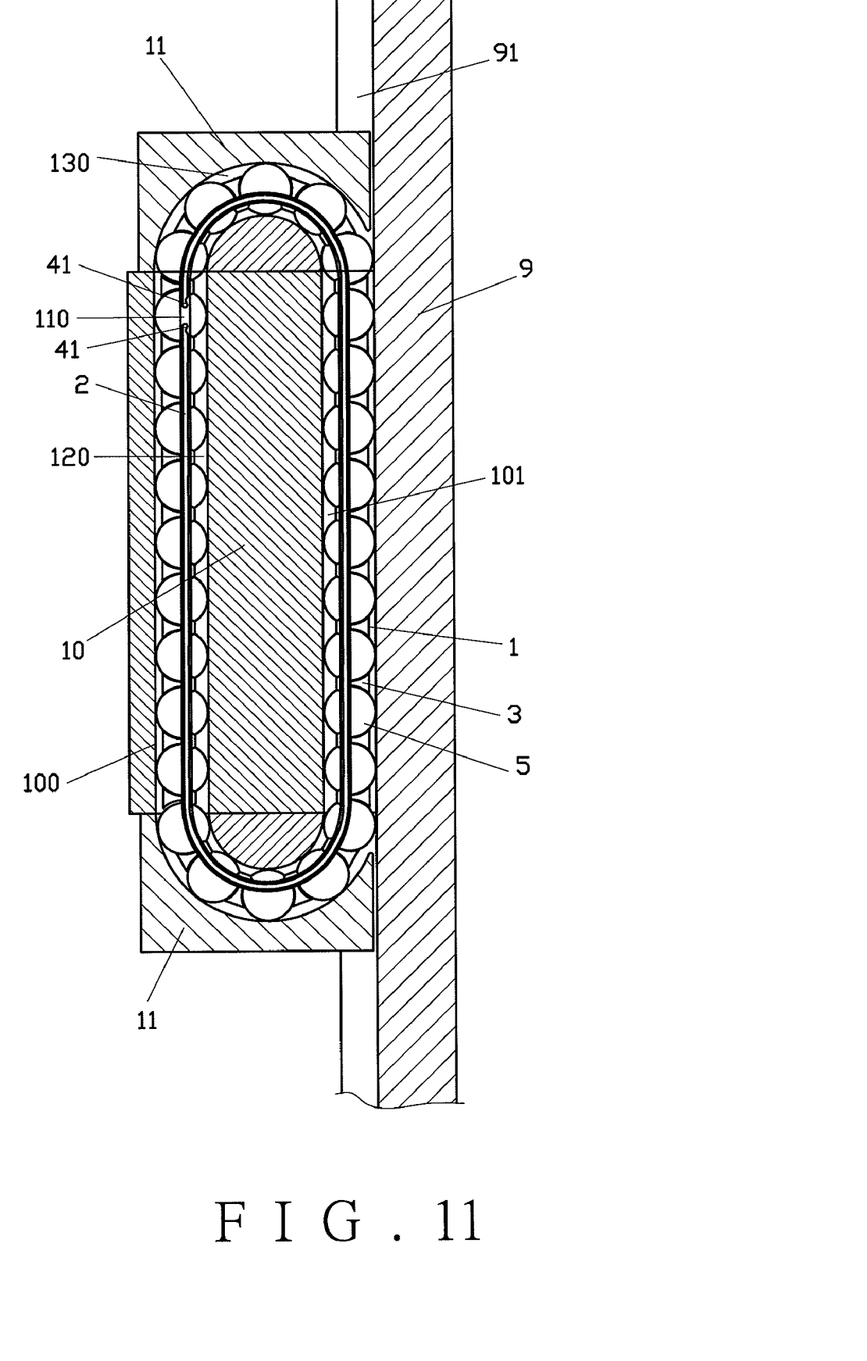
FIG. 11 is a schematic view showing the ball retainer chain and the serial balls traveling within a recirculating passage of the linear guide apparatus of the present invention.

Referring to FIG. 11, the ball retainer chain (1) is applied to a linear guide apparatus, like a linear sliding. Wherein, the apparatus comprises a guiding member, like a rail (9), whose side is disposed with a first raceway (91), a slider (10), which is disposed astride the rail (9), including a second raceway (101) disposed corresponding to the first raceway (91). At two ends of the slider (10) two end caps (11) are disposed, respectively. Moreover, the end cap (11) provides at least one turnaround channel (130) whose one end is connected to an end section of the second raceway (101) and other end is connected to a straight return passage (120) provided on the slider (10). Whereby, the second raceway (101), the turnaround channel (130), and the straight return passage (120) accordingly form a recirculating passage (100). The recirculating passage (100) includes at least one guiding groove (110) disposed therein. When the ball retainer chain (1) and the rolling balls (5) kept in the holes (21) move within the recirculating passage (100) of the linear guide apparatus, at least one side of the sides of the flat belt (2) could be guided in the guiding groove (110) for ensuring that the ball retainer chain (1) moves on the appropriate position. Concurrently, by means of the rolling of the rolling balls (5) on the first raceway (91) and the second raceway (101), the slider (10) is able to unlimitedly travel along the first raceway (91) on the rail (9).

Moreover, since the recirculating passage (100) is in fact a sealed passage, at least two portions are applied to form such passage. Convergent joints between the portions are generally defined on the junction of the straight return passage (120) and the turnaround channel (130). Even if a chamfer is formed on the convergent joint of the guiding groove (110), sectional differences or ragged edges are still readily generated in view of any manufacturing errors. Wherein, the belt (1) and the balls (5) retained in the holes (21) are guided by the guiding groove (110) of the recirculating passage (100); namely, the belt and the balls enter the turnaround channel (130) from the straight return passage (120), and vice versa. Thus, sectional differences or ragged edges generated at the convergent joint between the two ends of the two sides of the flat belt (2) in the guiding groove (110) and the guiding groove (110) of the belt (1) would still impede a smooth movement.

Figure 12:
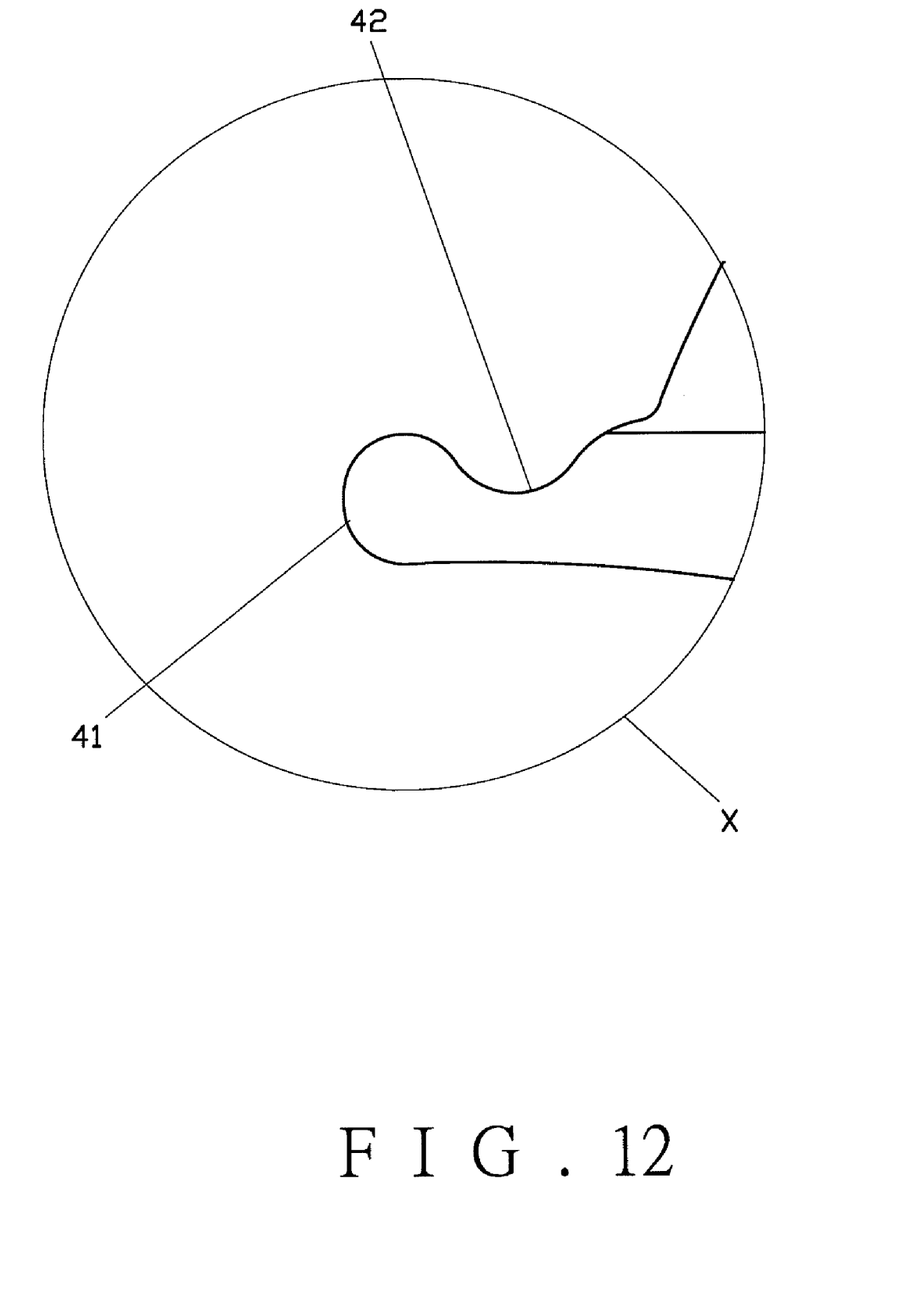
FIG. 12 is an enlarged view showing the section X in FIG. 4.
Figure 13:
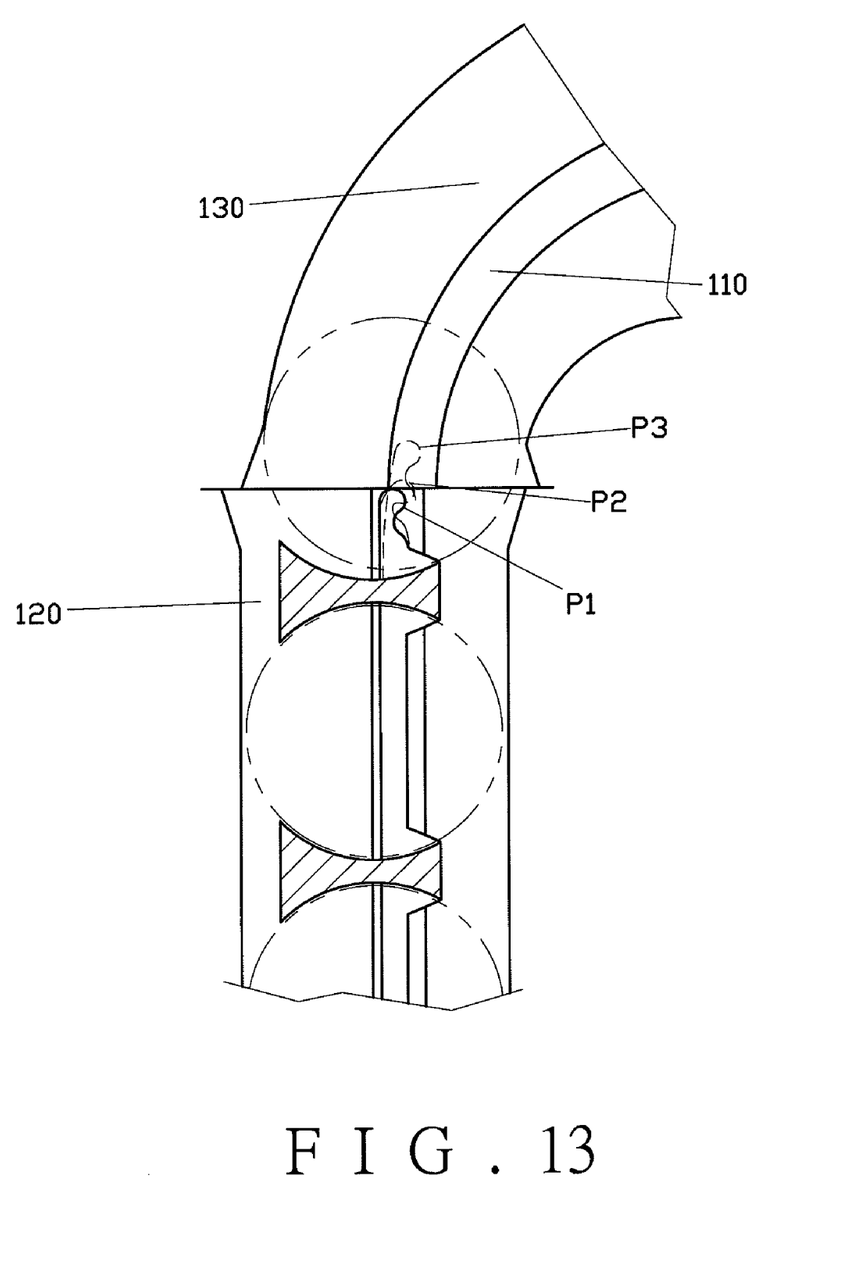
FIG. 13 is a schematic view showing two ends of the belt being accommodated in a guiding groove.
Figure 14:
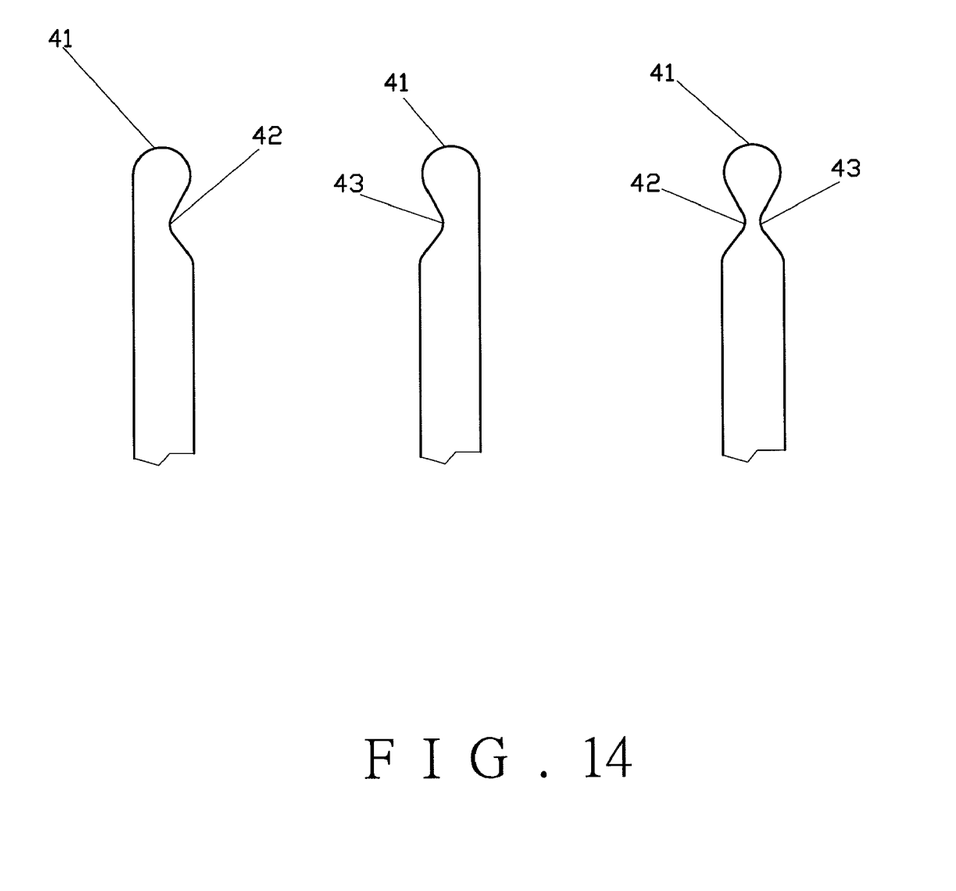
FIG. 14 is a schematic view showing a first recession and a second recession defined on a cylindrical form of the two ends of the belt.

Therefore, as shown in FIG. 12, a cylindrical form (41) is formed at the forefront of the two ends of the flat belt (2) of the ball retainer chain (1). A first recession (42) defined behind the cylindrical form (41) and smoothly connected thereto is provided at the inside of the flat belt (2). Hereby, since the first recession (42) is not as thick as other portions on the flat belt (2), any force exerted thereto would readily bend the indentation. Referring to FIG. 13, as a result, when the exterior of the cylindrical form (41) at the first position (P1) is impeded while traveling along the straight-turning spot on the guiding groove (110), the cylindrical form (41) would thence continue forwarding to the second position (P2) and bend itself inwardly. Accordingly, a preferable and smaller contacting angle between the cylindrical form (41) and the obstruction could be achieved. Therefore, the cylindrical form (41) could be unobstructed in the guiding groove, and the ball retainer chain (1) could be prevented from the resistance brought by the obstruction. Continuingly, when the cylindrical form (41) goes forward to a third position (P3), the cylindrical form (41) resumes its original state. Consequently, if the convergent joint of the partial components for constructing the recirculating passage (100) is set at the straight return passage (120) or at the turnaround channel (130), or if the ragged edge occupies a large scope at the convergent joint, the inside of the guiding groove (110) would possibly impede the guiding of the two ends at the two sides of the flat belt (2) of the guiding groove (110) that accommodates the ball retainer chain (1). Concurrently, a second recession (43) positioned behind the cylindrical form (41) and smoothly connected thereto is defined on the outside of the separating portions (22) of the flat belt (2). Referring to FIG. 14, if the cylindrical form (41) encounters any obstruction inside the guiding groove (110), the cylindrical form (41) would bend outwardly for passing through. If any obstruction emerges from both the inner side and the outer side of the guiding groove (110) at the convergent joint, the first recession (42) and the second recession (43) could be defined at the same time for the cylindrical form (41) to bend inwardly or outwardly, so that a fluent traveling thereof could be achieved.

I claim:

1. A ball retainer chain comprising a flat belt and a plurality of spacers; wherein, said flat belt including holes that are axially arranged and separating portions each disposed between every two of said holes; said spacers combining to said separating portions; an hole surface on said hole being formed between said flat belt along a vertical direction and two spacers; each separating portion of said flat belt having an upper surface and a lower surface, and said upper surface and said lower surface respectively including a left side and a right side; said spacer being further divided into an upper spacer and a lower spacer that individually combine to said upper surface and said lower surface of said separating portion of said flat belt; surfaces between said upper/lower spacers and said holes being formed by a smooth surface, a part of which being formed by a spherical surface and smoothly connected to said hole surface on said flat belt, allowing a connection between said holes and said spherical surfaces thereof to form an upper enveloping surface and a lower enveloping surface, respectively; said spherical surfaces including an opening, the other part of a smooth surface being arranged as an outward-stretched curve along a tangent line of said opening of said spherical surface; an opening direction of either said upper or said lower enveloping surface being slantingly disposed between a vertical direction of the cross-section of the flat belt and a horizontal direction of the cross-section of the flat belt of said flat belt; said spherical surfaces of said upper spacer and said lower spacer being interlacedly disposed at a left side and a right side, respectively; said opening directions being defined oppositely.

2. The ball retainer chain as claimed in claim 1, wherein, said curve is formed by a cylinder.

3. The ball retainer chain in claim 1, wherein, said curve is formed by a cone.

4. A method of making said ball retainer chain as claimed in claim 1 comprising a first mold part of each of left and right molds that are slantwise opened and closed along said opening direction of said spherical surface so as to combine with a second mold part of each of said left and right molds for an injection molding; said first mold parts of said left and right molds respectively forming smooth surfaces and holes of said upper and lower spacers as well as an appearance of partial ball retainer chain; said second mold parts of said left and right molds forming a rest appearance of said ball retainer chain; said first mold parts of said left and right molds including a parting line shaped at said hole; said parting line having an inclined angle that is not smaller than another inclined angle of a diagonal line on a cross-section of said hole on said flat belt; while said first mold parts of said left and right molds being slantwise opened and closed, said inclined angle thereof being thence larger than said inclined angle of said parting line.

5. The method as claimed in claim 4, wherein, while said first mold parts of said left and right molds are slantwise opened and closed, said inclined angle thereof is smaller than another inclined angle of said flat belt defined at a lateral side of said spherical surface, and said second mold parts of said left and right molds integrally combines with said first mold parts of said left and right molds.

6. The method as claimed in claim 5, wherein, said parting line of said first mold parts of said left and right molds and said lateral side of said flat belt at said curve are defined on a same smooth surface.

7. A linear guide apparatus for applying to the ball retainer chain as claimed in claim 1, comprising:
 a guiding member including a first raceway disposed on at least one side thereof;
 a slider disposed astride said guiding member including a second raceway disposed corresponding to said first raceway and two turnaround channels disposed at two ends of said second raceway, respectively; said turnaround channel having the other ends connected to a return passage, allowing a recirculating passage to be formed in said second raceway, said turnaround channel, and said return passage; said recirculating passage including at least one sealed guiding groove therein; and
 said flat belt of said ball retainer chain including two sides, and at least one side thereof being situated in said guiding groove; a ball being set in each hole of said ball retainer chain for said ball retainer chain and said balls to be rolled within said recirculating passage.

* * * * *